(12) United States Patent
Conti et al.

(10) Patent No.: US 10,255,142 B2
(45) Date of Patent: *Apr. 9, 2019

(54) USING RUN TIME AND HISTORICAL CUSTOMER PROFILING AND ANALYTICS TO DETERMINE CUSTOMER DISASTER RECOVERY VS. PRODUCTION DIFFERENCES, AND TO ENHANCE CUSTOMER DISASTER RECOVERY READINESS AND EFFECTIVENESS

(71) Applicant: International Business Machines Corporation, Armonk, NY (US)

(72) Inventors: Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/429,265

(22) Filed: Feb. 10, 2017

(65) Prior Publication Data
US 2018/0067824 A1  Mar. 8, 2018

Related U.S. Application Data

(63) Continuation of application No. 15/259,115, filed on Sep. 8, 2016.

(51) Int. Cl.
G06F 11/00 (2006.01)
G06F 11/14 (2006.01)

(52) U.S. Cl.
CPC ...... *G06F 11/1471* (2013.01); *G06F 11/1451* (2013.01); *G06F 11/1469* (2013.01); *G06F 2201/805* (2013.01); *G06F 2201/82* (2013.01)

(58) Field of Classification Search
CPC ............ G06F 11/1402; G06F 11/1451; G06F 11/3089
(Continued)

(56) References Cited

U.S. PATENT DOCUMENTS 7,849,161 B2    12/2010  Koch et al.
9,154,366 B1 *  10/2015  Martin ............. H04L 29/08072
(Continued)

OTHER PUBLICATIONS

List of IBM Patents or Patent Applications Treated as Related (Appendix P), Filed Apr. 17, 2017, 2 pages.
(Continued)

*Primary Examiner* — Chae M Ko
(74) *Attorney, Agent, or Firm* — Cantor Colburn LLP; William Kinnaman

(57) ABSTRACT

Aspects of the present invention include a method, system and computer program product. The method includes a processor setting one or more characteristics related to customer production; collecting customer production data; modeling a customer disaster recovery workload in relation to a corresponding customer production workload; collecting customer disaster recovery data; comparing the customer disaster recovery data to the customer production data; determining that at least one difference exists between the customer disaster recovery data and the customer production data; and determining from the at least one difference between the customer disaster recovery data and the customer production data, one or more ineffective customer disaster recovery resources and updating the one or more ineffective customer disaster recovery resources.

5 Claims, 4 Drawing Sheets

(58) Field of Classification Search
USPC .................................................... 714/15, 20
See application file for complete search history.

(56) References Cited

U.S. PATENT DOCUMENTS

| | | | |
|---|---|---|---|
| 9,575,858 | B2 | 2/2017 | Sugabrahmam et al. |
| 2007/0036331 | A1* | 2/2007 | Fitzgerald ........... H04M 3/5237 379/265.02 |
| 2010/0077257 | A1* | 3/2010 | Burchfield .......... G06F 11/1469 714/37 |
| 2011/0138391 | A1* | 6/2011 | Cho ....................... G06F 9/4881 718/102 |
| 2014/0236889 | A1* | 8/2014 | Vasan ................. H04L 67/1097 707/610 |
| 2014/0351644 | A1* | 11/2014 | Garg ....................... G06F 11/26 714/32 |
| 2015/0317194 | A1* | 11/2015 | Sampath ............... G06F 11/008 714/703 |
| 2015/0347242 | A1* | 12/2015 | Martos ................ G06F 11/1469 714/19 |
| 2015/0347546 | A1* | 12/2015 | Pathak ............. G06F 17/30575 707/625 |
| 2016/0048438 | A1* | 2/2016 | Martos ................ G06F 11/1469 714/33 |
| 2016/0062858 | A1* | 3/2016 | Gallagher ........... G06F 11/1484 714/6.23 |
| 2016/0092570 | A1* | 3/2016 | Ago .................. G06F 17/30864 707/770 |
| 2016/0217403 | A1 | 7/2016 | Gupte et al. |

OTHER PUBLICATIONS

Thomas R. Brown, et al., Pending U.S. Appl. No. 15/197,826 Entitled "Run Time Workload Threshold Alerts For Customer Profiling Visualization" filed Jun. 30, 2016.

Thomas R. Brown, et al., Pending U.S. Appl. No. 15/197,828 Entitled "Run Time and Historical Workload Report Scores for Customer Profiling Visualization" filed Jun. 30, 2016.

Thomas R. Brown, et al., Pending U.S. Appl. No. 15/197,835 Entitled "Z/OS SMF/RMF Workload Data Playback with Web Dashboard Visualization" filed Jun. 30, 2016.

Thomas R. Brown, et al., Pending U.S. Appl. No. 15/424,971 Entitled "Run Time Workload Threshold Alerts for Customer Profiling Visualization" filed Feb. 6, 2017.

Thomas R. Brown, et al., Pending U.S. Appl. No. 15/427,129 Entitled "Run Time and Historical Workload Report Scores for Customer Profiling Visualization" filed Feb. 8, 2017.

Thomas W. Conti, et al., Pending U.S. Appl. No. 15/197,827 Entitled "Run Time Test Workload Customer Profiling Baselines Visualization" filed Jun. 30, 2016.

Thomas W. Conti, et al., Pending U.S. Appl. No. 15/197,829 Entitled "Run Time Automatic Workload Tuning Using Customer Profiling Workload Comparison" filed Jun. 30, 2016.

Thomas W. Conti, et al., Pending U.S. Appl. No. 15/197,831 Entitled "Using Test Workload Run Facts and Problem Discovery Data as Input for Business Analytics to Determine Test Effectiveness" filed Jun. 30, 2016.

Thomas W. Conti, et al., Pending U.S. Appl. No. 15/197,833 Entitled "Run Time TPNS Workload Controls for Test Workload Tuning in Relation to Customer Profiling Workload" filed Jun. 30, 2016.

Thomas W. Conti, et al., Pending U.S. Appl. No. 15/197,843 Entitled "Visual Test Workload Execution Modeling" filed Jun. 30, 2016.

Thomas W. Conti, et al., Pending U.S. Appl. No. 15/197,844 Entitled "Run Time SMF/RMF Statistical Formula Methodology for Generating Enhanced Workload Data Points for Customer Profiling Visulization" filed Jun. 30, 2016.

Thomas W. Conti, et al., Pending U.S. Appl. No. 15/259,094 Entitled "Z/OS SMF Record Navigation Visualization Tooling" filed Sep. 8, 2016.

Thomas W. Conti, et al., Pending U.S. Appl. No. 15/259,099 Entitled "Measuring and Optimizing Test Resources and Test Coverage Effectiveness Through Run Time Customer Profiling and Analytics" filed Sep. 8, 2016.

Thomas W. Conti, et al., Pending U.S. Appl. No. 15/259,104 Entitled "Using Customer Profiling and Analytics to Understand, Rank, Score, and Visualize Best Practices" filed Sep. 14, 2016.

Thomas W. Conti, et al., Pending U.S. Appl. No. 15/259,107 Entitled "Using Best Practices Customer Adoption Business Intellegence Data as Input to Enterprise Resource Planning (ERP)" filed Sep. 8, 2016.

Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" filed Sep. 8, 2016.

Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed Sep. 8, 2016.

Thomas W. Conti, et al., Pending U.S. Appl. No. 15/259,120 Entitled "Determining If Customer Characteristics by Customer Gography, Country, Culture or Industry May Be Further Applicable to a Wider Customer Set" filed Sep. 8, 2016.

Thomas W. Conti, et al., Pending U.S. Appl. No. 15/259,122 Entitled "Using Customer and Workload Profiling and Analytics to Determine Score, and Report Portability of Customer and Test Environments and Workloads" filed Sep. 8, 2016.

Thomas W. Conti, et al., Pending U.S. Appl. No. 15/259,124 Entitled "Using Customer Profiling and Analytics to Understand Customer Workload Complexity and Characteristics by Customer Geography, Country, and Cuture" filed Sep. 8, 2016.

Thomas W. Conti, et al., Pending U.S. Appl. No. 15/259,130 Entitled "Using Workload Profiling and Analytics and Score Complexity of Test Environments and Workloads" filed Sep. 8, 2016.

Thomas W. Conti, et al., Pending U.S. Appl. No. 15/259,168 Entitled "Using Customer Profiling and Analytics to Understand Customer Environment and Workload Complexity and Characteristics by Industry" filed Sep. 8, 2016.

Thomas W. Conti, et al., Pending U.S. Appl. No. 15/264,629 Entitled "Using Customer Profiling and Analytics to Create a Relative, Targeted, and Impactful Customer Profiling Environment/ Workload Questionnaire" filed Sep. 14, 2016.

Thomas W. Conti, et al., Pending U.S. Appl. No. 15/264,630 Entitled "Using Customer Workload Profiling and Analytics to understand and Visualize Customer Workload Execution" filed Sep. 14, 2016.

Thomas W. Conti, et al., Pending U.S. Appl. No. 15/264,631 Entitled "Using Run Time and Historical Customer Profiling and Analytics to Iteratively Design, Develop, Test, Tune, and Maintain a Customer-Like Test Workload" filed Sep. 14, 2016.

Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" filed Sep. 14, 2016.

Thomas W. Conti, et al., Pending U.S. Appl. No. 15/264,634 Entitled "Standardizing Run-Time and Historical Customer and Test Environments and Workloads Comparisons Using Specific Sets of Key Platform Data Points" filed Sep. 14, 2016.

Thomas W. Conti, et al., Pending U.S. Appl. No. 15/264,638 Entitled "Using Run-Time and Historical Customer Profiling and Analytics to Determine and Score Customer Adoption Levels of Platform Technologies" filed Sep. 14, 2016.

Thomas W. Conti, et al., Pending U.S. Appl. No. 15/264,639 Entitled "Standardizing Customer and Test Data and Information Collection for Runtime and Historical Profiling Environments and Workload Comparisons" filed Sep. 14, 2016.

Thomas W. Conti, et al., Pending U.S. Appl. No. 15/424,965 Entitled "Using Customer Profiling and Analytics to Understand

(56) References Cited

OTHER PUBLICATIONS

Customer Environment and Workload Complexity and Characteristics by Industry" filed Feb. 6, 2017.

Thomas W. Conti, et al., Pending U.S. Appl. No. 15/424,973 Entitled "Run Time Test Workload Customer Profiling Baselines Visualization" filed Feb. 6, 2017.

Thomas W. Conti, et al., Pending U.S. Appl. No. 15/427,130 Entitled "Visual Test Workload Execution Modeling" filed Feb. 8, 2017.

Thomas W. Conti, et al., Pending U.S. Appl. No. 15/427,135 Entitled "Run Time Automatic Workload Tuning Using Customer Profiling Workload Comparison" filed Feb. 8, 2017.

Thomas W. Conti, et al., Pending U.S. Appl. No. 15/427,137 Entitled "Using Test Workload Run Facts and Problem Discovery Data as Input for Business Analystics to Determine Test Effectiveness" filed Feb. 8, 2017.

Thomas W. Conti, et al., Pending U.S. Appl. No. 15/429,262 Entitled "Measuring and Optimizing Test Resources and Test Coverage Effectiveness Through Run Time Customer Profiling and Analytics" filed Feb. 10, 2017.

Thomas W. Conti, et al., Pending U.S. Appl. No. 15/429,268 Entitled "Using Workload Profiling and Analytics and Score Complexity of Test Environments and Workloads" filed Feb. 10, 2017.

\* cited by examiner

USING RUN TIME AND HISTORICAL CUSTOMER PROFILING AND ANALYTICS TO DETERMINE CUSTOMER DISASTER RECOVERY VS. PRODUCTION DIFFERENCES, AND TO ENHANCE CUSTOMER DISASTER RECOVERY READINESS AND EFFECTIVENESS

CROSS-REFERENCE TO RELATED APPLICATIONS

The present application is a continuation application of U.S. patent application Ser. No. 15/259,115 filed on Sep. 8, 2016, the contents of which are incorporated herein by reference.

BACKGROUND

The present invention relates to the testing of software, hardware, firmware, and/or other disciplines, and more specifically, to a method, system and computer program product that implement aspects of workload and operational profiling, coupled with business analytics, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes setting, by a processor, one or more characteristics related to customer production; collecting, by the processor, customer production data; and modeling, by the processor, a customer disaster recovery workload in relation to a corresponding customer production workload. The method also includes collecting, by the processor, customer disaster recovery data; and comparing, by the processor, the customer disaster recovery data to the customer production data. The method further includes determining, by the processor, that at least one difference exists between the customer disaster recovery data and the customer production data; and determining, by the processor, from the at least one difference between the customer disaster recovery data and the customer production data, one or more ineffective customer disaster recovery resources and updating, by the processor, the one or more ineffective customer disaster recovery resources.

According to another embodiment of the present invention, a system includes a processor in communication with one or more types of memory, the processor configured to set one or more characteristics related to customer production; to collect customer production data; and to model a customer disaster recovery workload in relation to a corresponding customer production workload. The processor is also configured to collect customer disaster recovery data; to compare the customer disaster recovery data to the customer production data. The processor is further configured to determine that at least one difference exists between the customer disaster recovery data and the customer production data; and to determine, from the at least one difference between the customer disaster recovery data and the customer production data, one or more ineffective customer disaster recovery resources and to update the one or more ineffective customer disaster recovery resources.

According to yet another embodiment of the present invention, a computer program product includes a non-transitory storage medium readable by a processing circuit and storing instructions for execution by the processing circuit for performing a method that includes setting, by a processor, one or more characteristics related to customer production; collecting, by the processor, customer production data; and modeling, by the processor, a customer disaster recovery workload in relation to a corresponding customer production workload. The method also includes collecting, by the processor, customer disaster recovery data; and comparing, by the processor, the customer disaster recovery data to the customer production data. The method further includes determining, by the processor, that at least one difference exists between the customer disaster recovery data and the customer production data; and determining, by the processor, from the at least one difference between the customer disaster recovery data and the customer production data, one or more ineffective customer disaster recovery resources and updating, by the processor, the one or more ineffective customer disaster recovery resources.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
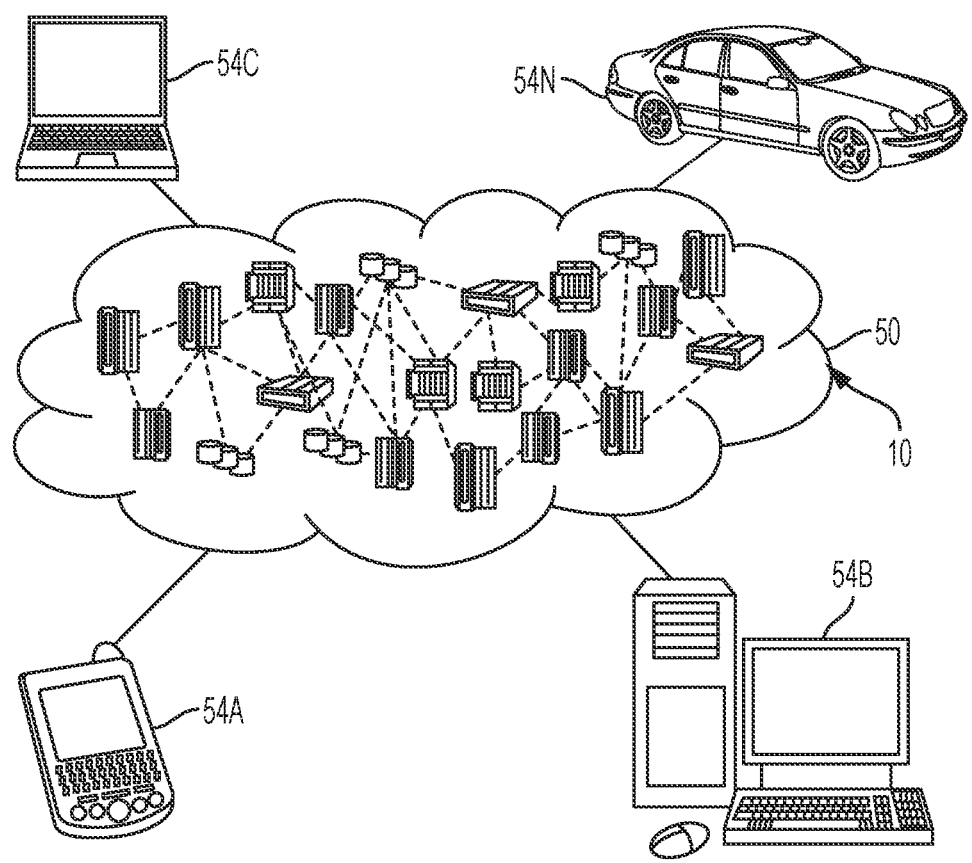
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
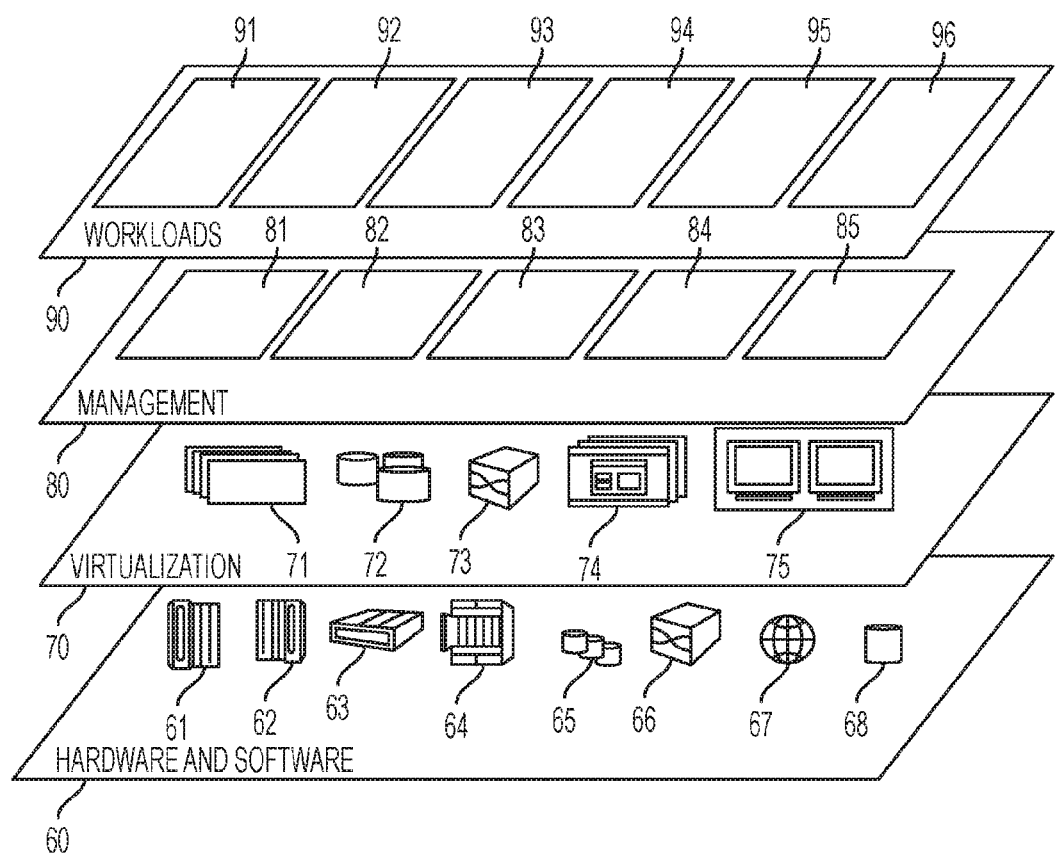
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for comparing customer disaster recovery environments and workloads to customer production environments and workloads and for using any differences to make changes to the customer disaster recovery resources to better match customer production recovery goals in accordance with one or more embodiments of the present invention.

Figure 3:
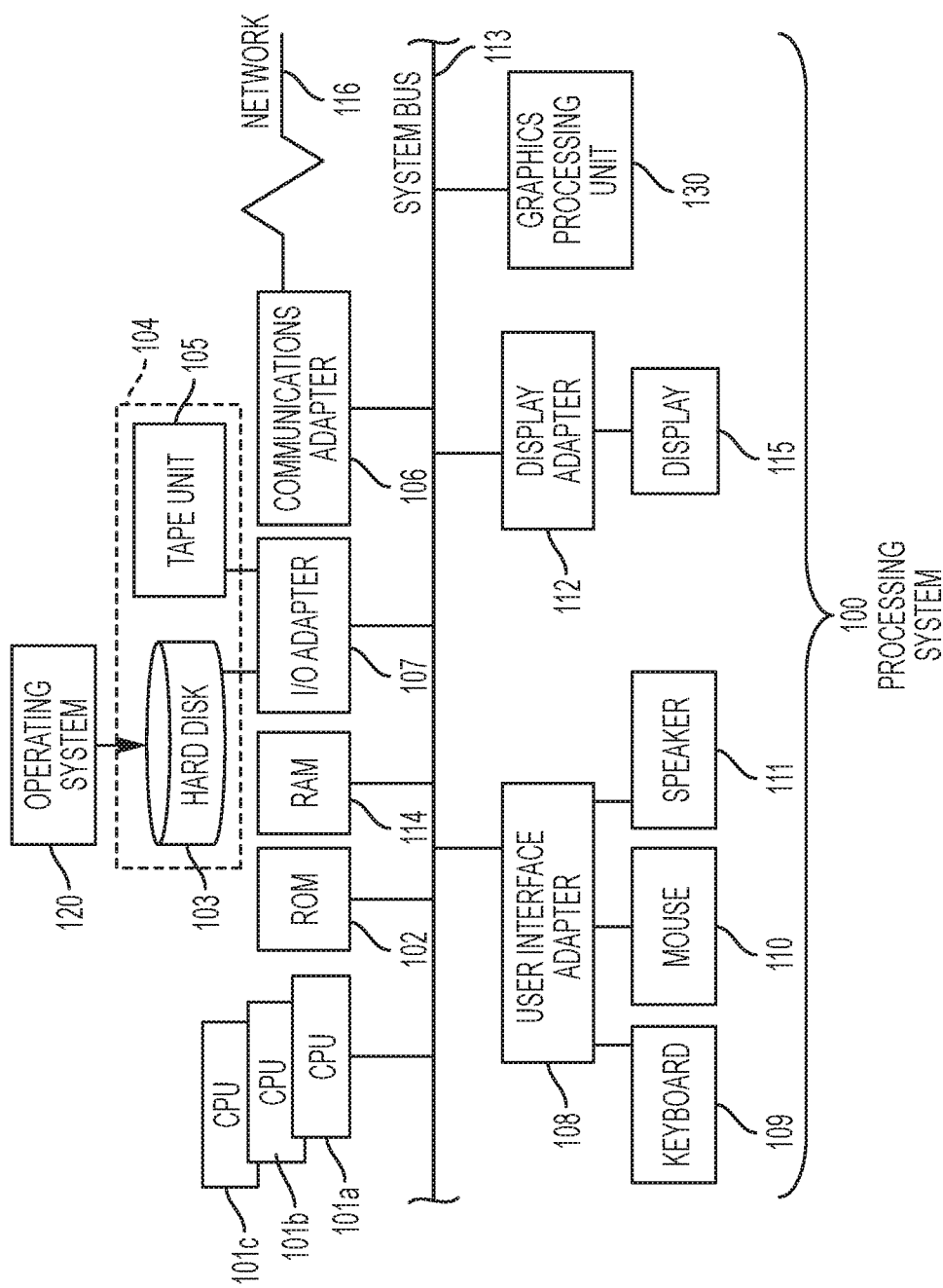
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for comparing customer disaster recovery environments and workloads to customer production environments and workloads and for using any differences to make changes to the customer disaster recovery resources to better match customer production recovery goals.

Figure 4:
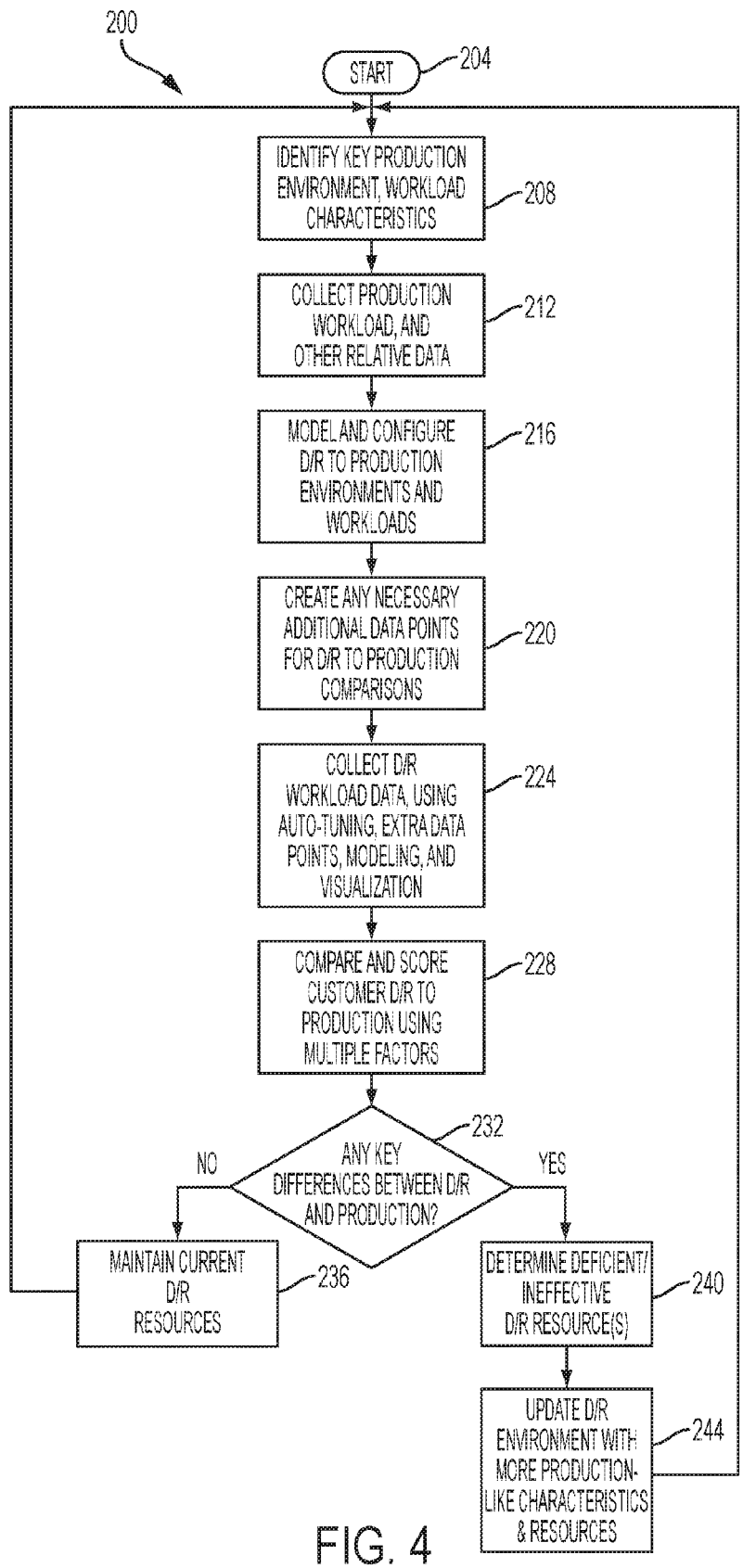
FIG. 4 is a flow diagram of a method for comparing customer disaster recovery environments and workloads to customer production environments and workloads and for using any differences to make changes to the customer disaster recovery resources to better match customer production recovery goals in accordance with one or more embodiments of the present invention.

With reference now to FIG. 4, a flow diagram illustrates a method 200 according to one or more embodiments of the present invention for comparing customer disaster recovery environments and workloads to customer production environments and workloads and for using any differences to make changes to the customer disaster recovery resources to better match customer production recovery goals.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

After a start operation in block 204, an operation in block 208 sets the key customer production environment, workload, human resources, and other characteristics needed to be emulated in the corresponding customer disaster recovery environment. This operation may also prioritize these key customer production environment, workload, human resources and other characteristics. This information may be stored in a database.

An operation in block 212 collects customer production environment, workload data, human resources, and any other data relative for comparison with the corresponding customer disaster recovery environment. This information may also be stored in a database.

An operation in block 216 utilizes various workload modeling technologies and methodologies to model the customer disaster recovery workload in relation to the corresponding customer production workload. This information may also be stored in a database.

For example, a disaster recovery workload execution model may be created by utilizing a body of available workload work unit activity data, data store activity data, and a workload execution distribution scheme. From this, a disaster recovery workload execution can be modeled with customer data convergence as a goal. The model may be created using a visual interface. Workload models can be created, stored for others to use, and for future use. The models contain the information about the execution distribution of workload work units. Each work unit exercises a set of activities that utilize one or more data stores. By creating and storing the work unit activities by work unit and data store, one can create distribution adjustment controls such as sliders to increase or decrease the amount of an activity. Furthermore, the activities can be grouped by work unit (transaction), data store (database), main activity for a unit of work, atomic activity for a unit of work, or combo activity for multiple activities in a unit of work. With the control value and the available workload work unit data, one can adjust the workload execution distribution to match the visual model being displayed. In this way, an analyst can see the change and understand if the change may help or harm convergence to a customer activity model.

The workload data required for execution distribution modeling includes the data store mapping for work unit activity and work unit mapping. An execution distribution is calculated using this information. Since each work unit activities are known, creating a distribution is as simple as a multiplication. Thus, embodiments of the present invention utilize disaster recovery workload application information relating transaction activity to transaction data store, to thereby visually model the execution mix of transactions for the disaster recovery workload. The resulting mix is used to create a transaction distribution to be followed by the user simulation tool such that each transaction is appropriately exercised according to the visual model.

An operation in block 220 utilizes various run time and historic data point creation techniques to create any necessary additional data points to facilitate enhanced customer disaster recovery to production workload, environment, operational, and other comparisons. This information may also be stored in a database.

An exemplary data point creation technique is one on which one or more existing workload data points are selected for input into as a number of statistical formulas, which may be determined, created or chosen depending on the new or additional workload data points that are desired to be created. A range of from simple formulas (e.g., ones that calculate or determine sums, averages, percentages, etc.) to relatively more complex statistical formulas may be utilized. With existing or created system management facility and/or resource management facility data points and technical subject matter expertise (SME) as input to the statistical formulas, the new and/or additional workload data points may be determined or calculated. The new/added data points provide greater insight and enhanced relationships and understanding of the targeted software system functional areas at customer profiling and disaster recovery workload comparison run time. The new or added data points may then be stored in a database.

If desired, a customer profiling baselines visualization may utilize the new or added data points, together with existing customer data coupled with the live collection of disaster recovery data during the disaster recovery run. All of this data may be stored in a database or in some other type of memory. The data may be used in a web application to visually represent to the user or operator the levels of load and stress and ratios of activity for sets of related data points. As an additional, integrated feature of this web application, the runtime statistical formula may provide deeper levels of insight into the workloads' characteristics, which can be used for enhanced and expanded workload ion various areas—for example, in manual or automatic tuning, report scores, threshold alerts, playback of individual data points relating to records of activity or performance activity within the software system (e.g., SMF/RMF playback), disaster recovery workload execution modeling, and business analytics to determine disaster recovery workload effectiveness.

An operation in block 224 collects and stores (e.g., in a database) customer disaster recovery environment, workload data, human resources, and any other data relative for comparison with the corresponding production environment.

An operation in block 228 compares and scores customer disaster recovery to production environments, workloads, human resources, other factors or metrics, using various techniques. This information may also be stored in a database.

In an exemplary technique, an operation caches or temporarily stores historical customer workload data summary statistics which have been previously stored in a database or other memory. These statistics may comprise various statistical measures. Also, disaster recovery data relating to the active or current disaster recovery workload being performed is also cached or temporarily stored. Various types of statistical measures between the historical customer workload data and the active disaster recovery workload data are determined, calculated or computed. These exemplary statistical measures may include, for example, and without limitation, ratios, percentages, and differences. The various determined statistical measures for some or all of the various data types, for example, Analysis Point (AP), Analysis Point Category (APC), and Analysis Point Group (APG), which represents both the historical customer workload data and the active disaster recovery workload data, may have corresponding color codes determined, calculated or computed. The color codes may vary by color depending upon the determined scores of the data points. These color-coded data point scores may be displayed on a visual diagram on a screen display. Also displayed may be the runtime and historical disaster recovery workload report scoring.

An operation may be performed which generates various one or more report scores relating to runtime disaster recovery and historical customer workloads. The determined values or scores of the various data point types—e.g., Analysis Point (AP) scores, Analysis Point Category (APC), and Analysis Point Group (APG) scores, along with data point (DP) scores and the generated report scores may be displayed in a "Report Scores Overview." A "Report Visualization" may also be provided which depicts scores by data points in the form of bar graphs. In addition, smaller sub-charts may be displayed, for example, by allowing the sub-charts to hover within the overall larger diagram.

Next, a decision operation in block 232 determines if there are any key differences between the customer disaster recovery and production environments, workloads, etc. If not, the method 200 chooses to maintain the disaster recovery resource allocation to be current and up to date with respect to the corresponding production resource allocation. Also, an operation in block 236 maintains the currently allocated disaster recovery resources with no changes. The method 200 then branches back to the operation in block 208.

If the operation in block 232 determines that there are key differences between the customer disaster recovery and production environments, workloads, etc., then the method 200 chooses to analyze the currently allocated disaster recovery resources to determine which are deficient and need to be enhanced in relation to the corresponding production resources.

An operation in block 240 determines which customer disaster recovery resources are deficient and/or ineffective related to the corresponding production resources and capabilities. The appropriate degree of disaster recovery resources is provided to achieve functional coverage, activity levels, and/or a variety or range of other customer disaster recovery objectives equivalent to the corresponding customer production environment.

An operation in block 244 updates the customer disaster recovery environment, workload(s), human resources, and/or other key areas with the necessary resources to provide more production like/level capabilities. This information may be stored in a database. Where possible, the amount of customer disaster recovery resources expended to achieve the desired customer disaster recovery to production objectives is optimized (e.g., reduced).

The method 200 then branches back to the operation in block 208. The method 200 may iterate on a regular basis if it is done maintaining customer disaster recovery resources.

Given that customer environments can vary significantly between their disaster recovery and corresponding production environments, sometimes with multiple production environments using a single disaster recovery environment, for staggered production environment disaster recovery and/or worst case multiple or all production environments disaster recovery, the ability to effectively and efficiently size and match customer disaster recovery workloads and environments to production workloads and environments is desirable.

In addition, as customers may contract with a supplier for disaster recovery trials, tests, and for actual disaster recovery operations, it is also desirable that any of these services be properly sized, and used in a technically proficient and optimized manner, and be cost and business effective. Whether a customer has their own environments and resources for disaster recovery, or contracts with an external business resiliency services provider undersized disaster recovery environments and/or services can negatively impact a customer's business, potentially significantly or even catastrophically. Also, oversized disaster recovery environments and/or services can incur unnecessary costs to the customer's business.

Using effective customer profiling and analytics, embodiments of the present invention solve multiple problems for disaster recovery trials, tests, and actual disaster recovery operations, for both customer internal and/or external disaster recovery environments, resources, services, including how to: identify and understand the customer's disaster recovery environment and trial and actual disaster recovery operations workload characteristics in relation to the corresponding production key environment and workload characteristics; score the customer's disaster recovery environment and trial and actual disaster recovery operations workload characteristics in relation to the corresponding production key environment and workload characteristics; tune the customer's disaster recovery trial workload characteristics in relation to the corresponding production key workload characteristics; determine and size the appropriate degree of disaster recovery resources to achieve functional coverage, activity levels, and/or a variety or range of other customer disaster recovery objectives equivalent to the corresponding customer production environment(s), for both trial and actual disaster recovery operations; and optimize and reduce the amount of customer disaster recovery trial and actual disaster recovery operations resources expended to achieve these customer disaster recovery objectives.

Given that customer disaster recovery test and trial workload runs and actual disaster recovery operations can be complicated, resource and time intensive, limited in availability, and expensive to fund, staff, configure, stage, run, and analyze, and can span multiple days or even weeks, properly focusing and optimizing available customer disaster recovery resources to match customer production recovery goals can result in much more effective use, financial benefits, and greater business continuity and resiliency.

In embodiments of the present invention, the enhancement of customer recovery environments and workloads to match the key corresponding characteristics of customer production environments and workloads, and in an effective manner, provides multiple capabilities, efficiencies, and financial benefits including: to understand the effectiveness of the workload run (software, hardware, firmware) as viewed from a variety of perspectives, including problem determination, scalability, performance, stress/load, etc.; to tune disaster recovery trial workloads much closer to their intended production activity goals (through a wide range of factors/metrics); to significantly reduce the amount of customer limited and high value System z systems, storage, network, environmental, personnel time and resources to accomplish disaster recovery objectives, resulting in both financial savings and reduced environmental impact; and to increase customer disaster recovery plan (DRP) effectiveness through properly sized workloads and environments, reducing the need for additional trials and/or resource adjustments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    setting, by a processor, one or more characteristics related to customer production;
    collecting, by the processor, customer production data;
    modeling, by the processor, a customer disaster recovery workload in relation to a corresponding customer production workload;
    collecting, by the processor, customer disaster recovery data;
    comparing, by the processor, the customer disaster recovery data to the customer production data;
    determining, by the processor, that at least one difference exists between the customer disaster recovery data and the customer production data; and
    determining, by the processor, from the at least one difference between the customer disaster recovery data and the customer production data, one or more ineffective customer disaster recovery resources and updating, by the processor, the one or more ineffective customer disaster recovery resources; and
    creating, by the processor, additional data points related to one or both of customer production data and customer disaster recovery data by selecting one or more existing workload data points for input into one or more statistical formulas which determine the additional data points.

2. The computer-implemented method of claim 1 wherein setting, by a processor, one or more characteristics related to customer production comprises prioritizing, by the processor, one or more characteristics related to customer production.

3. The computer-implemented method of claim 1 wherein the one or more characteristics related to customer production comprise characteristics needed for emulation in a corresponding customer disaster recovery environment, and wherein the one or more characteristics related to customer production comprise environment characteristics and human resources characteristics.

4. The computer-implemented method of claim 1 wherein modeling, by the processor, a customer disaster recovery workload in relation to a corresponding customer production workload creates a disaster recovery workload execution model containing information relating to an execution distribution of one or more workload work units.

5. The computer-implemented method of claim 1 wherein comparing, by the processor, the customer disaster recovery data to the customer production data comprises assigning, by the processor, a score to a result of comparing the customer disaster recovery data to the customer production data using one or more statistical measures.

* * * * *